Dec. 30, 1969    N. POTASH    3,486,730
QUICK DISCONNECT COUPLING AND VALVE COMBINATION
Filed Aug. 18, 1966
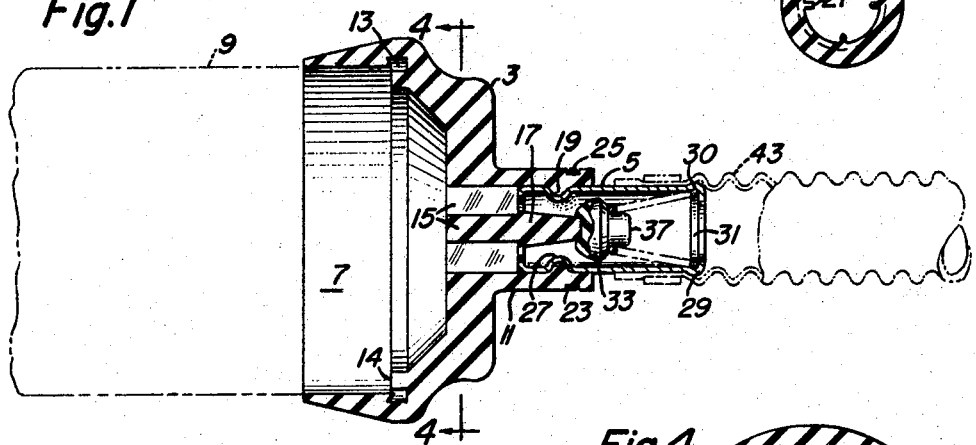
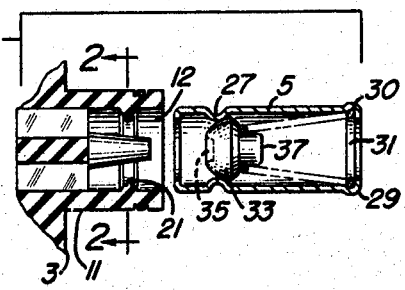
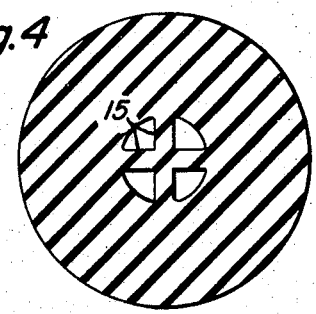
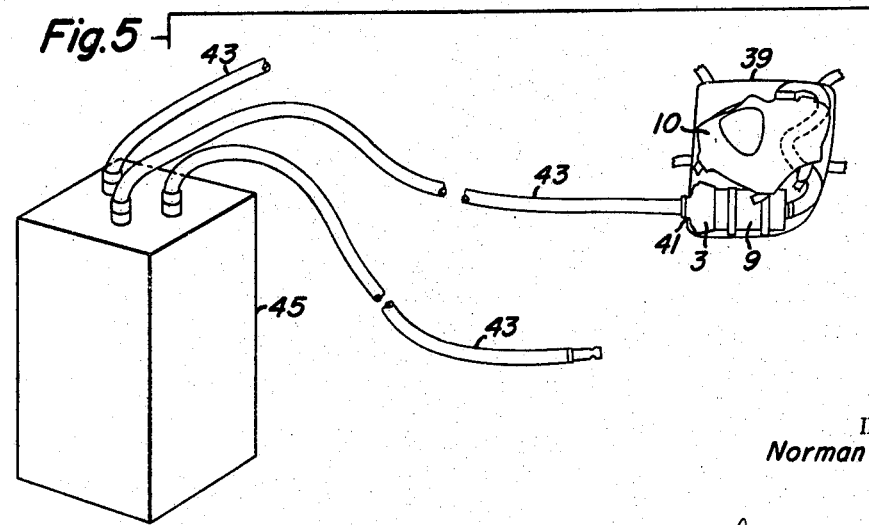
INVENTOR
*Norman Potash*
BY *Harry M. Saragovitz*
*Edward J. Kelly, Herbert Berl*
*& Benjamin S. Colley*    ATTORNEYS

United States Patent Office 3,486,730
Patented Dec. 30, 1969

---

3,486,730
QUICK DISCONNECT COUPLING AND VALVE COMBINATION
Norman Potash, Baltimore, Md., assignor to the United States of America as represented by the Secretary of the Army
Filed Aug. 18, 1966, Ser. No. 573,764
Int. Cl. F16l 37/28, 33/00, 29/00
U.S. Cl. 251—149.7                    4 Claims

ABSTRACT OF THE DISCLOSURE

A low pressure quick disconnect coupling having a resilient cup-shaped female connector connected to a rigid tubular male connector by a stem means integral with the female connector and attached to the male connector by internal bead means within the stem means; a plunger means centrally located within the stem means being provided to engage a ball-shaped and spring-actuated valve means centrally located within the male connector means, the valve means being provided to open the coupling to air flow.

---

This invention relates to a low pressure quick disconnect or breakaway coupling designed for use in low pressure systems up to 1 p.s.i., and more particularly to a quick disconnect coupling adapted to be employed in connection with a protective mask and a collective protector in a tank or in the oxygen system of an aircraft.

The known breakaway coupling of this nature is of a complex design and structure requiring accurately machined metal components. The female connector consists of an outer cylindrical body and an inner sleeve with a plurality of metal balls therein. The balls are actuated by springs and hold the male connector in place. The female connector further incorporates two rubber O rings and a spring actuated metal valve. The male connector consists of a machined nozzle inserted into a rubber adapter. The nozzle has a groove for the engagement of said plurality of metal balls within the female connector and a web which presses on the spring actuated metal valve thereby opening the coupling to air flow.

One important object of the present invention is the provision of a quick disconnect coupling of the character described which consists of a resilient type female connector of a one piece molded construction, and a rigid tubular male connector having a spring actuated resilient valve therein.

A further object of the present invention is the provision of a quick disconnect coupling of the character described in which the components do not require precision and costly machining operations.

A further object of the present invention is the provision of an extremely simple and inexpensive coupling device which may be quickly and automatically disconnected without the use of hands. The invention can be used to best advantage in instances where both hands of the operator must be free to accomplish other tasks, as for example in a situation where a protective mask is worn by a combatant in a tank. When unforeseen hazards are encountered and the occupant(s) must leave the tank quickly, the coupling becomes disconnected from the canister by the mere straight pull exerted by the body of the leaving individual.

The above and other objects, features, and advantages of the invention will be fully understood from the following description, considered in connection with the accompanying illustrative drawing.

In the drawing:

FIGURE 1 is a sectional view of the quick disconnect coupling assembly showing the engagement of the male and female connectors.

FIGURE 2 is a cross section of a stem of the female connector taken along line 2—2 of FIGURE 3, showing a plurality of tips.

FIGURE 3 is a fragmentary sectional view of the female connector and a sectional view of the male connector in disengaged state.

FIGURE 4 is a cross section of the female connector taken along line 4—4 of FIGURE 1, showing a web.

FIGURE 5 is a diagrammatic representation of a protective mask inside of a carrier and a collective protector, showing the relative position of the invention in connection thereof.

It is to be noted that the collective protector generally shown in FIGURE 5 is designed to be utilized with a plurality of protective masks or units thereof, but for the purpose of clarity, henceforth, reference will be made to a single unit only.

The quick disconnect coupling generally shown at 2 comprises a resilient cup-shaped female connector 3 and a tubular male connector 5. The female connector 3 is molded of a resilient material which remains flexible at temperatures as low as minus 65° F. such as silicon rubber. The male connector 5 may be made of any suitable rigid material such as metal or plastic. The female connector 3 at one end has a substantially large opening 7 for the attachment of a conventional type cylindrical canister 9, a component of a protective mask 10. When inserted into the opening 7 the canister 9 generally rests in abutment with an annular shoulder 14. The opening 7 adjoins and terminates within an annular relief or stress reducing groove 13. The latter serves the purpose of affording more of a snug fit between the canister and the female connector. The female connector 3 at the opposite end is provided with a stem 11 having an opening 12 for the insertion of the male connector 5. Located within the opening 12 and adjoining the opening 7 there is formed a web 15 having a plunger 17. Located near the edge of the stem within the opening 12 there is molded an annular bead 19 having a plurality of tips 21, preferably four. The tips serve at assembly to effect the correct holding action on the male connector 5. An annular groove 23 retaining a metal snap ring 25 is provided near the opening 12 on the exterior surface of the stem 11. The forward end or edge of the male connector 5 is slightly crimped inwardly for easier insertion of the same into the opening 12 of the stem 11. Located near this forward crimped edge of the male connector 5 there is an annular groove 27. This groove 27 is adapted for the engagement of the mating bead 19 of the female connector 3, whereby said groove and the mating bead 19 act as a seal. The male connector 5 at the opposite end has a bead 29 which provides an internal annular groove 30 retaining a conical expansion coil spring 31. The bead 29 serves as means for attachment of the hose 43 onto the male connector 5. The expansion spring contains and actuates a resilient hemispherically shaped valve 33. The valve at the forward end has a relatively shallow central cavity 35 while at the opposite end it is provided with a stem 37. The cavity 35 is provided for the engagement of the tip of the plunger 17. The stem 37 is firmly fixed or mounted within the smaller end of the coil spring 31 as shown in FIGURES 1 and 3.

The canister 9 having the female connector 3 is placed into a carrier 39 with the stem 11 protruding through an opening 41. The canister 9 is then firmly secured within the carrier to prevent movement. The male connector 5 is fastened within a rubber hose 43, which in turn is connected onto a collective protector 45. The male connector 5 now is inserted into the opening 12 of the stem 11. This action completes the connection of all the units described.

Upon the insertion and pushing action of the male connector 5 into the female connector 3, the hemispherically-shaped valve 33 engages the plunger 17, the tip of the latter resting in the cavity 35. As the male connector 5 is pushed further inwardly the plunger 17 presses the valve 33 backwards against the coil spring 31. Full engagement of the male and female connectors is obtained through means of the bead 19 snapping in place into the groove 27 which also serves as a seat (see FIGURE 3) for the now unseated or open valve 33. The snap ring 25 serves as a reinforcement device for the stem 11 and prevents separation of the coupling by an accidental angular force or blow. When not in use, the hemispherically-shaped valve 33 is normally seated against the inner surface of the groove 27, thereby serving as a dust cap for the hose 43.

The quick disconnect coupling generally shown at 2 now is ready for the passage of forced purified air therethrough. The purified air is supplied or forced from the collective protector 45 generally fixed inside of a tank (not shown) through the rubber hose 43, the coupling generally shown at 2, and through the canister 9 into the protective mask 10.

To disconnect the coupling, all that is needed is a straight pull exerted by the wearer of the mask on the hose 43. This pull may be effected without the use of the hands. This action will automatically disconnect the male connector 5 having the hose 43 from the female connector 3 having the canister 9 with the protective mask 10. Thus the wearer of the protective mask is quickly separated from the collective protector. This action enables the wearer of the mask a quick departure from the tank.

The invention may be similarly adapted and utilized in the oxygen system of an aircraft or in any other system or structure where an automatic and quick disconnection of the feed line is desired.

Having fully described one particular form of my invention, it should be understood that I do not intend thereby to limit myself to the precise construction shown, but intend to include all modifications that fall within the spirit and scope of the invention as defined in the following claims.

I claim:
1. A quick disconnect coupling separable in response to a predetermined tensile force comprising:
 (A) cup shaped female connector means of resilient material having a substantially large opening at one end adapted for the attachment of canister means therein,
  (1) hollow stem means integral with said connector having internal bead means therein at the opposite end for the attachment of a male connector means therein,
  (2) plunger means centrally located within an opening of said stem means, said plunger means being provided to engage a hemispherically-shaped spring actuated valve means,
 (B) tubular male connector means made of rigid material adapted for the attachment of a hose means at one end, and said cup-shaped female connector means at the opposite end, said tubular male convector means having a groove near its forward edge adapted for the engagement in mating relationship with said bead of the internal wall of the stem means, the inner surface of said groove providing a valve seat for said hemispherically shape valve means,
  (1) a hemispherically - shaped spring - actuated valve means centrally located within said tubular male connector means adapted for the purpose of opening said quick disconnect coupling to air flow when engaged by said plunger means.

2. A quick disconnect coupling as defined in claim 1 wherein said hemispherically-shaped spring-actuated valve means has a cavity at its forward end adapted upon the insertion of said tubular male connector into the stem of said cup-shaped female connector to engage the tip of said plunger within said stem and at the same time unseat and push said valve rearwardly from said groove thereby opening said quick disconnect coupling to air flow.

3. A tubular male connector comprising in combination:
 (A) an external bead adjacent one end thereof exteriorly retaining a hose and interiorly retaining one end of a coil spring,
 (B) a centrally located hemispherically-shaped valve biased by said spring,
 (C) an external groove adjacent to the opposite end thereof wherein the internal surface of said groove serves as a seat for said hemispherically-shaped spring biased valve.

4. A tubular male connector as defined in claim 8 wherein said hemispherically-shaped spring actuated valve has:
 (A) a centrally located cavity at its forward end which serves as a seat for a mating member,
 (B) a steam at the opposite end thereof adapted to retain the opposite end of said valve spring.

References Cited

UNITED STATES PATENTS

| | | | |
|---|---|---|---|
| 2,448,688 | 9/1948 | Scheiwer | 285—304 XR |
| 2,450,446 | 10/1948 | Rupp | 251—149.6 XR |
| 2,731,278 | 1/1956 | Soderstrom | 251—149.7 |
| 2,896,971 | 7/1959 | Kolar | 251—149.7 |
| 3,131,733 | 5/1964 | Monahon | 141—354 XR |
| 3,329,180 | 7/1967 | Van Brocklin | 251—149.6 XR |

FOREIGN PATENTS

| | | |
|---|---|---|
| 710,589 | 9/1941 | Germany. |
| 382,185 | 10/1932 | Great Britain. |
| 506,044 | 5/1939 | Great Britain. |

DANIEL BLUM, Primary Examiner

U.S. Cl. X.R.

128—142.5; 141—346; 285—177, 244